April 23, 1968  R. J. ALLYN  3,379,460
COUPLING AND SEAL FOR CONDUITS
Filed March 8, 1966  2 Sheets-Sheet 1
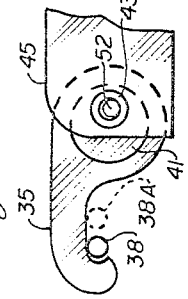
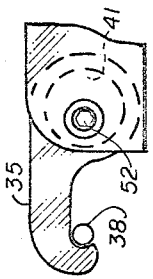
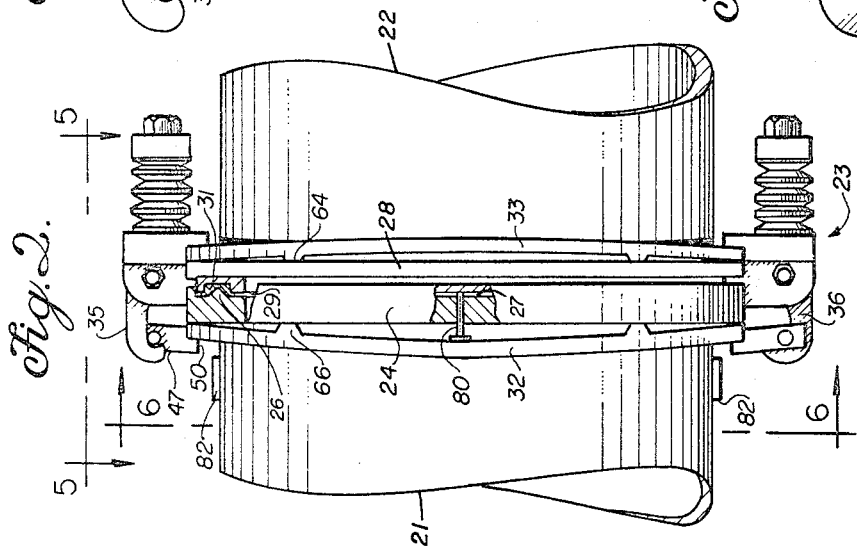
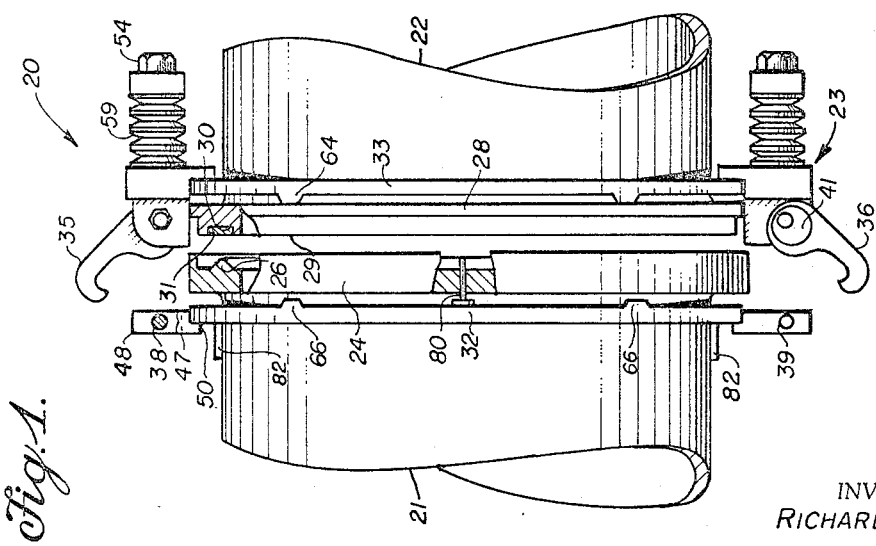
INVENTOR.
RICHARD J. ALLYN
BY
ATTORNEY

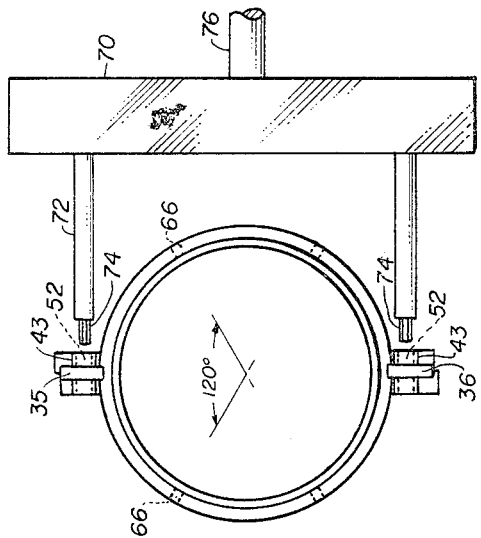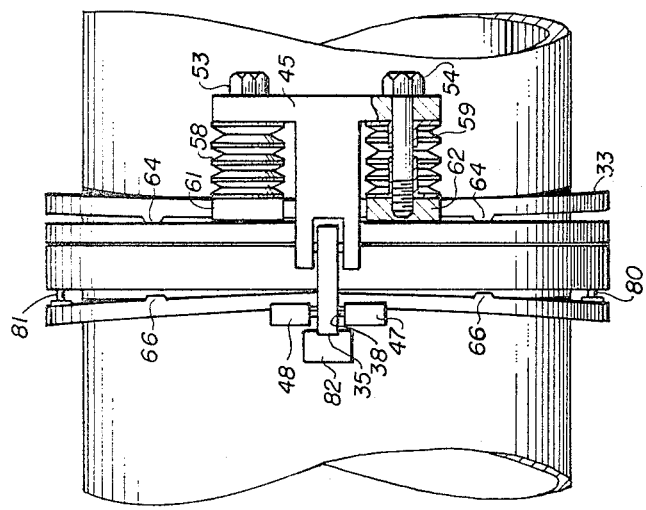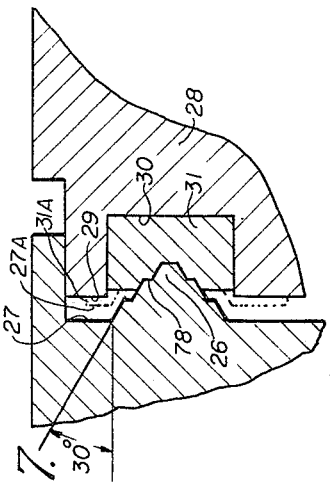

United States Patent Office 3,379,460
Patented Apr. 23, 1968

3,379,460
COUPLING AND SEAL FOR CONDUITS
Richard J. Allyn, Bellevue, Wash., assignor to the United States of America as represented by the United States Atomic Energy Commission
Filed Mar. 8, 1966, Ser. No. 534,977
9 Claims. (Cl. 285—312)

ABSTRACT OF THE DISCLOSURE

A coupling for maintaining a leak-tight seal between the flanged conduits of a vacuum system wherein the flexible collars apply uniform spring pressure to force the conduit flanges against a soft metal seal.

---

The invention disclosed herein was made or conceived under Contract AT(04-3)-400 with the United States Atomic Energy Commission.

The invention generally relates to couplings and seals for conduits, and more particularly, the invention pertains to a coupling for maintaining a leak-tight seal between conduits of a vacuum system, which coupling utilizes thin flanges and is operable for easily, quickly and reliably connecting and disconnecting the conduit, and is adapted to be operated remotely.

Various known arrangements are available for sealing sections of conduit to maintain therein either a high degree of vacuum or a high pressure. However, in certain environments, such as a linear accelerator complex, not only is there a need to maintain a very high degree of vacuum in certain conduits, but there is a further need to quickly and easily connect and disconnect the conduits to avoid damage to equipment and minimize exposure time of operating personnel to radioactivity often present in and around a linear accelerator. No known prior sealing arrangement is entirely adequate for the above purposes.

The presence of radioactivity in the vicinity of a linear accelerator makes it necessary to use seals that will not deteriorate due to the radioactivity. Various metal seals stand up well in such an environment, but generally require very finely machined surfaces to achieve a high degree of vacuum. Such machined surfaces must be carefully handled to avoid being scratched or otherwise damaged in order to prevent discontinuities which may result in leaks. A metal seal comprising a soft metal ring or the like, generally replaceable after each use, and which is caused to cold flow when the conduits are brought together has been found to be satisfactory for some purposes. Since the soft metal cold flows, any minor scratches or slight damage to any part of the sealing arrangement does not prevent the soft metal from completely filling and sealing the space between the conduits. However, in using soft metal as a seal, it is necessary generally, in order to make a leak-tight seal, to apply a high compression load to the metal to the point that it yields beyond its elastic limit. Internal stresses equal to the yield strength of the metal are thereby created in the metal and are relieved by creeping or cold flow of the metal. Under a sustained high compression load, the rate of cold flow of the metal diminishes until, in terms of reasonably finite times and displacements, equilibrium is reached. For this reason, soft metal gaskets which are not confined or are not uniformly loaded often suffer from leakage problems and generally are unreliable for repeated closures.

Leakage resulting from such creeping may be minimized by holding the seal between the conduit joints by means of a coupling which applies a spring pressure evenly around the circumference of the joint during each closure. Various conventional coupling arrangements are known, such as spring loaded bolts in mating flanges, for applying spring pressure uniformly to a joint. However, to achieve ease and quickness in manipulating a coupling, it becomes apparent that the number of points to be manipulated should be minimized. A conventional arrangement, such as the spring loaded bolt arrangement, requires manipulation generally at four or more points to achieve evenly applied pressure. An arrangement which is manipulated at less than four points would require correspondingly thicker flanges to obtain the rigidity necessary for even application of pressure. In large diameter conduit, the thickness of the flanges becomes a major item of cost. To ensure that a joint having relatively thin flanges may be easily, quickly, remotely and reliably connected and disconnected, it is found desirable to evenly apply spring pressure around the circumference of the joint and yet to have not more than two points that require manipulation.

Accordingly, it is an object of the invention to uniformly apply spring pressure to a seal between two sections of conduit by means of a coupling which is manipulated at a minimum number, e.g., not more than two points.

Another object is to manipulate a coupling having thin flanges at two points and thereby apply pressure at multiple points to form a seal between two sections of conduit.

Still another object is to manipulate a coupling at two points spaced 180° apart and thereby apply pressure at six points to a seal between two sections of conduit.

A further object is to provide a coupling adaptable to be operated from a remote location.

A still further object is to provide a relatively inexpensive and reliable seal for joining sections of conduit of a vacuum system, especially in a radioactive environment.

One other object is to seal a joint between two sections of conduit by means of multiple sealing surfaces on a knife edge pressed into a soft metal.

Another object is to seal a joint between two sections of conduit of a vacuum system so as to restrain helium gas under a differential pressure of $10^{-4}$ torr so as to have a leakage rate of less than $1 \times 10^{-6}$ cc. of He/sec. even after 50 to 80 closures.

Another object is to automatically release a tightly sealed joint between two sections of conduit upon disconnection of a coupling mechanism therebetween.

Other object and advantageous features will be apparent in the following description.

To enable one skilled in the art to practice the invention more readily, a specific embodiment thereof, given by way of example only, is described hereinafter with reference to the accompanying drawing, in which:

FIGURE 1 is a side view of two sections of conduit shown in position prior to being joined by means of a coupling arrangement mounted thereon according to the invention;

FIGURE 2 is a view showing the conduits of FIGURE 1 joined by the coupling;

FIGURE 3 is an enlarged view of a hook member of the coupling arrangement of FIGURE 1, which hook is shown in extended position prior to forcing the sections of conduit together;

FIGURE 4 is a view of the hook of FIGURE 3 shown in its retracted position movement to which position causes the sections of conduit to be forced together;

FIGURE 5 is a view of the upper portion of the coupling of FIGURE 2 looking in the direction of the arrows 5—5;

FIGURE 6 is a reduced and simplified view of portions of the conduits and coupling as viewed from the left in FIGURE 2, and includes in addition a device for operating both hooks of the coupling simultaneously; and FIGURE 7 is an expanded cross sectional view of a portion of the flanges of FIGURE 2, showing a groove filled with a soft metal in one flange and a stepped knife edge extending from the face of the other flange partially into the soft metal.

In the specific embodiment of the invention shown in FIGURES 1 and 2, two tubular metal conduit sections 21 and 22 are shown. In FIGURE 1, the conduits are shown in a position prior to being joined, while they are shown in the joined position in FIGURE 2. The conduits are connected by means of a coupling comprising an upper arrangement 20 and a lower arrangement 23, a male flange 24 and a relatively thin female flange 28.

The male flange 24 is welded to the conduit 21, and has a knife edge 26 extending from a face 27 near the circumference. The female flange 28 is welded to the conduit 22 and is formed with a groove 30 in a face 29, which groove is shaped to receive the knife edge 26. The groove 30 is filled with a soft malleable metal 31 such as indium that will plastically deform, i.e., cold flow, under the concentrated pressure of the knife edge inserted so that metal cold flows to exactly conform to the contours of the knife edge and thereby forms a leak-tight seal. Since the soft metal cold flows, small scratches or other slight damage to the surface of the knife edge or indium may be tolerated, thereby obviating special handling of the flanges that is required for sealing arrangements having finely machined sealing surfaces. Moreover, as disclosed herein, often the flanges need not be massively rigid flanges as heretofore utilized.

Sealing engagement of the knife edge and the indium is by means of a coupling assembly which includes a collar member 32 loosely mounted behind flange 24 on conduit 21, and a like collar 33 mounted on conduit 22 behind flange 28. Two latch hooks 35 and 36 are mounted in diametrically spaced relation on collar 33, while a pair of pins 38 and 39 are correspondingly mounted on collar 32 for compliant engagement with respective hooks 35 and 36.

More specifically, each of the hooks 35 and 36 are extended and retracted by means of a cam 41 rotatably mounted in one end thereof, as best shown in expanded views in FIGURES 3 and 4. The cam 41 is frictionally mounted for eccentric rotation in an assembly including a T-bracket 45 which has a hole for receiving a hub 43 provided on cam 41. The cross arm portion of bracket 45 is resiliently supported with respect to the collar 33 by a pair of springs 58 and 59 (FIGURES 2 and 5). The springs 58 and 59 are perforated dished spring metal washers stacked in alternate directions along a pair of bolts 53 and 54 which pass through perforations in the cross arm of bracket 45 to hold the assembly to a pair of arms 61 and 62 which are suitably attached to peripheral portions of collar 33. The free end of the hook 35 is shaped for engagement with the pin 38 which is mounted between a pair of arms 47 and 48 of a bracket 50 which is suitably attached to the collar 32, as best shown in FIGURE 5. Each of the hooks 35 and 36 may be rotatably rocked from a radial projecting position, with the cams positioned as shown in FIGURE 3, to engage a respective pin 38 or 39. Most expeditiously, a hexagonal hole 52 is provided in the end of each of the hubs 43 for receiving a conventional hexagonal wrench or the like, so that the hook may be rotated to engage the pin, and then retracted merely by turning the wrench counterclockwise (ccw) as viewed in FIGURE 3. Upon engagement, the pin 38 (or 39, respectively) prevents the hook from being rotated further ccw, the cam 41 now overcomes the frictional engagement within the hook, thereby camming the hook into closed position 38–A. Since the hooks 35 and 36 are connected to the collar 33 through respective brackets 45 (FIGURES 2 and 5) and springs 58 and 59, the collars 32 and 33 are pulled toward each other, thereby applying a resilient compressive force between flanges 24 and 28 to drive the knife edge 26 at least partially into the indium metal 31 in groove 30. As will be more fully discussed hereinafter, the knife edge loading is regulated so that equilibrium load bearing stresses within the indium support the compressive force between the flanges with the knife edge only partially into the indium. Therefore, although the hooks are fully retracted, the flange faces 27 and 29 remain slightly apart as shown in FIGURE 2 so that the knife edge 26 is in spring loaded bearing relation to the indium seal.

Now with respect to the manner of applying the compressive forces between flanges 24–28 to obtain effective sealing engagement, it will be noted that four blocks or bosses 64 are provided which extend from the collar 33 toward the free side surface of flange 28. Two of the four bosses 64 are shown in FIGURES 1 and 2, and a third is shown in FIGURE 5, it being understood that identical bosses 64 are symmetrically spaced apart around the collar 33, and that, similarly, four bosses 66 extend from the collar 32 into engagement with flange 24. In FIGURE 6, the bosses 66 are shown alternately spaced apart 60° and 120°, with the hooks 35 and 36 located midway between the bosses which are spaced 120° apart.

Each of the collars 32 and 33 are adapted to undergo flexural deflection in the circumferential direction, i.e., to spring very stiffly to apply the compressive force. More particularly, no bosses are provided directly beneath the hooks 35 and 36, wherefor the collars thereunder are flexurally deflected toward respective flanges when the hooks are retracted to couple the conduit sections. The stiffness of the collars is selected, i.e., the length of the effective lever arm to thickness proportions of the collars is made such that deflection occurs with facile retraction of the hooks acting through the springs 59. The springs 59 are sufficiently stiff to cause the portion of the collars adjacent the hooks to deflect to the extent that they are brought firmly against respective flanges 24 and 28. This deflection causes the collars to pivot about the bosses so that the portion of each collar at 90° from the hooks is bowed outwardly as shown in FIGURE 2. Thus it is seen that the coupling is manipulated for opening or closing purposes at two diametric points while force is applied to each flange at six points spaced about 60° apart, i.e., at the bosses and at points adjacent the hooks. Pressure is thereby applied uniformly to the relatively thin flanges and therefore to the sealing surfaces defined by the knife edge and indium.

It is emphasized hereby that the force applied to the flanges 24 and 28 by means of the arrangements 20 and 23 and collars 32 and 33 is substantially equal at each of the bosses 64 and 66 and at the points adjacent the hooks. Any excess or unprecise tolerances in the parts is taken up by both the collars and the spring washers 58 and 59. The spring washers also provide a sufficient resiliency to take up slack due to the cold flow of the indium.

In practice, it has been found optimal to utilize collars having a spring rate such that full deflection of the collars requires two-thirds of the total desired clamping force, while one-third of the total desired clamping force is exerted by the deflected collar portions to the flanges thereunder in the region of the hook and pin locking arrangement.

Where a coupling is to be remotely operated, it is found desirable for rapid and easy operation to have not more than two points requiring manipulation. For various reasons, it is further desirable to operate all portions of the coupling simultaneously. One arrangement for either manually or automatically operating a coupling simultaneously is shown in FIGURE 6. This arrangement includes a gear box 70 and a pair of shafts 72 extending therefrom. A hexagonal wrench 74 extends from the end of each shaft 72 for engagement with corresponding holes 52 in respective hubs 43 of the hooks 35 and 36. Upon driving an input shaft 76 either manually or automatically, the shafts 72 are driven in the proper direction and with the necessary force and speed to rotate the hooks to connect or disconnect the conduits 21 and 22. Such an arrangement provides not only rapid, easy and simultaneous manipulation, but is readily adaptable for remote operation.

An improved seal between the flanges 24 and 28 may be achieved by forming the knife edge 26 with steps 78 as shown in FIGURE 7. Experiment has shown that the best seals are obtained when the sides of the steps are at approximately 30° with respect to a line normal to the face of the flange. When the flanges are brought together, the sides of the steps 78 shear the indium as the knife edge is driven therein, causing the indium to cold flow and conform to the exact contours of the knife edge. Experiment has also shown that, for successive closures to be reliable, the indium must cold flow at least a slight additional increment during each closure. Consequently, the groove 30 is made wide enough to permit the indium, after repeated closures, to cold flow by increments out of the groove into the space between the faces of the flanges. However, the groove 30 must not be made so wide as to permit the indium to completely flow out of the groove on the first closure or only a few closures thereafter.

With the groove 30 of the proper width, e.g., ¼- to ½-inch wide, it has been found that on the first closure the knife edge penetrates to the point that the first step is just into the indium as shown in FIGURE 7. During subsequent closures, the indium will flow incrementally into the space between the faces 27 and 29, as for example as indicated at 31–A, at which time the face 27 will be in the position 27–A with respect to the face 29. Sealing, therefore, occurs not only along the knife edge, which provides multiple sealing surfaces on the steps 78, but by means of the indium between the faces 27 and 29. Such a seal, in conjunction with the previously described coupling, has restrained helium gas under a differential pressure of $10^{-6}$ torr so as to have a leakage rate of less than $1 \times 10^{-6}$ cc. of He/sec. even after 50 to 80 successive closures. Thereafter, the indium has been repacked into the groove without remelting and leak-tight seals obtained during successive closures.

During disconnection of the conduits 21 and 22, there is a tendency of the knife edge to stick in the indium. A convenient arrangement of overcoming this tendency to stick is by means of a pair of pins 80 and 81 (FIGURES 1, 2 and 5). The pins are located in the flange 24 opposite the center of the section of the collar which bows outward when the hooks 35 and 36 are retracted. The pins extend slightly beyond the face 27 of the flange 24 when the flanges are disengaged and the collar 32 is snugly against the flange 24. The pins are forced to the extended position by engagement of the collar 32 with the pins. When the flanges are brought together by retraction of the hooks 35 and 36, the pins 80 and 81 are engaged by the face 29 of the flange 28 and driven outward. However, since the collar 32 bows outward when the hooks are retracted, as discussed hereinbefore, the pins are free to move to the positions shown in FIGURES 2 and 5 so as not to prevent engagement of the faces 27 and 29. When the hooks are extended to disconnect the conduit, the collar 32 returns to its original position, driving the pins against the face of the flange 28. To ensure that the pins drive the flanges apart, reacting devices 82 may be suitably fastened to the conduit 21 (FIGURE 2) so that the full spring force of the collar 32 is exerted against the pins. The two flanges, therefore, are automatically driven apart by the energy stored in the collar, which is sufficient to overcome any tendency of the flanges to stick together after the hooks are extended.

While there has been described what may be considered to be a preferred embodiment of the invention in the foregoing, modifications may be made therein within the scope of the invention as defined in the appended claims.

The invention claimed is:

1. A coupling for maintaining a leak-tight seal between first and second sections of conduit, comprising:

(a) a first flange attached to one end of said first conduit section;
(b) a second flange attached to one end of said second section;
(c) compressive seal means disposed between abutting end faces of said flanges;
(d) a first circumferentially flexural collar member mounted on said first section adjacent said first flange;
(e) connecting means for applying a compressive clamping force between said first collar member and said second flange for forcing said first and second flanges together, said compressive force being applied to at least a pair of points spaced equidistantly apart circumferentially; and
(f) a plurality of load bearing projections disposed equidistantly between said first collar member and said first flange and said connecting means for providing multiple points of contact between said first collar member and said first flange at points between those whereat force is applied by said clamping force means, said first collar member being responsive to application of said force to pivot about said projections and flex therebetween to uniformly transmit said clamping force through said projections and said first flange to said seal means;
(g) said first collar member is so proportioned in axial thickness with respect to its circumferential length as to be capable of deformation within its elastic limit, said projections are bosses axially extending from said first collar member toward said first flange, and said connecting means is operable to deform adjacent portions of said first collar member about said bosses as fulcrums toward said first flange to provide a continued bias force applied at spaced multiple points forcing said conduits together.

2. A coupling for maintaining a leak-tight seal between sections of conduit according to claim 1, including a second collar member mounted adjacent said second flange, and wherein said connecting means apply the compressive clamping force at corresponding points of said first and second members.

3. A coupling for maintaining a leak-tight seal between sections of conduit according to claim 1, wherein said plurality of projections are symmetrically spaced around the circumference between said first member and said first flange, and said connecting means are located midway between pairs of said projections so that upon application of force by said connecting means to said first member, the portions of said first member adjacent said connecting means spring stiffly toward said first flange and into engagement therewith, while the portions of said first member midway between said connecting means bow outward from said first flange.

4. A coupling for maintaining a leak-tight seal between sections of conduit according to claim 3, wherein said plurality of projections includes four bosses alternately spaced 60° and 120° apart, and said connecting means are located midway between the bosses that are spaced 120° apart.

5. A coupling for maintaining a leak-tight seal between sections of conduit according to claim 3, including disconnecting means between said second flange and said first member, said disconnecting means being located adjacent the portion of said first member which bows away from said first flange when force is applied to the flanges by the connecting means so that upon removal of the force applied by the connecting means, the bowed portion of the first member is moved toward the second flange, driving the disconnecting means against the second flange.

6. A coupling for maintaining a leak-tight seal between sections of conduit according to claim 5, wherein said disconnecting means is a pin extending through said first flange for engagement with said first member and said second flange.

7. A coupling for maintaining a leak-tight seal between sections of conduit according to claim 1, wherein said compressive seal means includes a circumferential knife edge extending from said first flange, and wherein said second flange is formed with a groove for receiving said knife edge and said groove is filled with indium and is of sufficient width to permit incremental cold flow of the indium between the flanges when the knife edge is driven into the indium upon application of force to said first and second flanges by said connecting means.

8. A coupling for maintaining a leak-tight seal between sections of conduit according to claim 7, wherein said knife edge is formed with a plurality of steps to form multiple sealing lines between the steps and the indium.

9. A coupling for maintaining a leak-tight seal between sections of conduit according to claim 8, wherein the sides of said steps are formed in the knife edge at an angle of approximately 30° with a line normal to the portion of the flange from which the knife edge extends.

References Cited

UNITED STATES PATENTS

| | | | |
|---|---|---|---|
| 605,780 | 6/1898 | Cram | 285—368 X |
| 764,347 | 7/1904 | Carlson | 285—368 X |
| 2,587,170 | 2/1952 | Klinger | 285—279 |
| 2,833,568 | 5/1958 | Corsette | 285—415 X |
| 3,058,761 | 10/1962 | Christophersen | 285—364 X |
| 3,186,743 | 6/1965 | Russel. | |

FOREIGN PATENTS 1,097,773  1/1961  Germany.

EDWARD C. ALLEN, *Primary Examiner.*

ROBERT SKUDY, *Assistant Examiner.*